W. HESTON.
OAT-MEAL MACHINE.

No. 170,560.  Patented Nov. 30, 1875.

Witnesses:  Inventor:
J. H. Campbell  William Heston
J. A. Kohler  per Humphrey & Stuart
  Attys.

UNITED STATES PATENT OFFICE.

WILLIAM HESTON, OF AKRON, OHIO, ASSIGNOR TO FERDINAND SCHUMACHER, OF SAME PLACE.

IMPROVEMENT IN OATMEAL-MACHINES.

Specification forming part of Letters Patent No. 170,560, dated November 30, 1875; application filed September 11, 1875.

*To all whom it may concern:*

Be it known that I, WILLIAM HESTON, of Akron, Summit county, Ohio, have invented an Improvement in Oatmeal-Machines, of which the following is a specification:

My invention relates to that class of oatmeal-machines which consist of a hopper with a perforated metallic bottom, having a free motion above a series of horizontal knives, the latter being stationary, or moving freely in an opposite direction, and so arranged that the oats falling endwise through the perforations in the bottom of the hopper shall be sheared off by the horizontal knives as the hopper and knives moves across each other.

The object of my invention is to make the meal coarse or fine at will, to render the particles thereof perfectly uniform in size, and to insure the cutting of each kernel of the oats. This I accomplish by arranging below the knives, and intermediately between them, a series of bars having a flat upper surface, against which the ends of the kernels of grain passing through the orifices in the hopper strike, and are arrested until cut off by the knives. These bars are so located that the grain cannot pass between the bars and the knives until cut off, when the severed pieces fall over the edge of the bar into a proper receptacle below.

Figure 1:
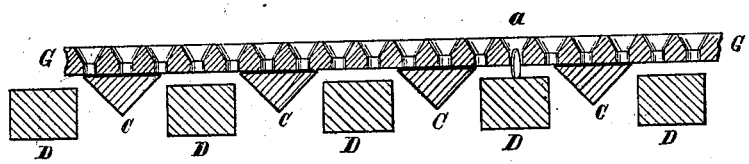
Figure 2:
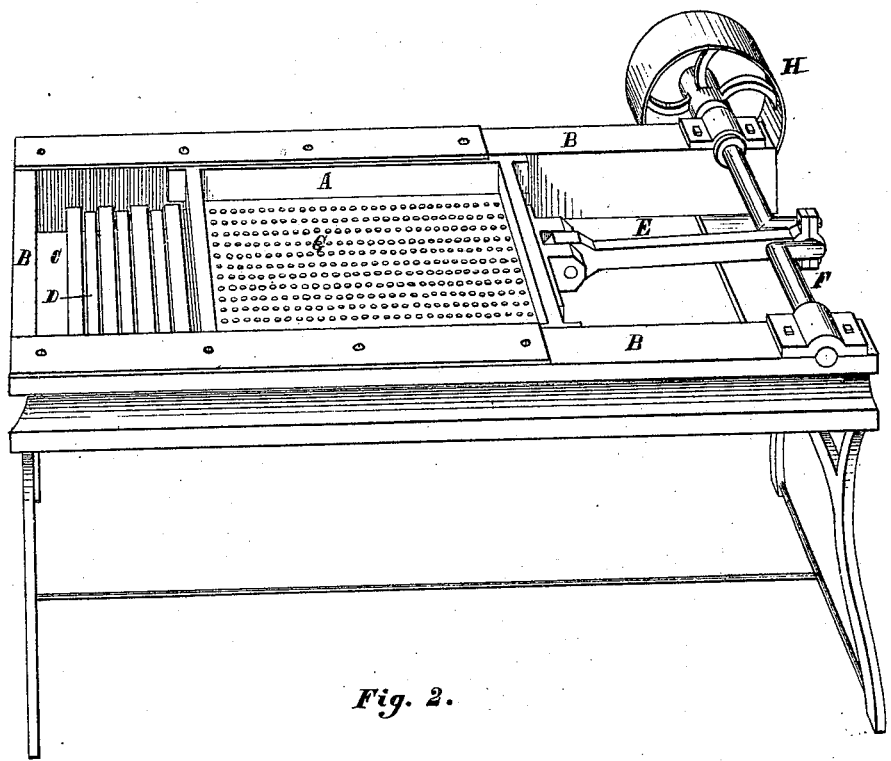

In the drawing accompanying this specification, Fig. 2 is a perspective view of an oatmeal-machine embodying my invention, and Fig. 1 a cross-section of a portion of the bottom of the hopper, and of the knives and bars, to show their construction and arrangement.

In operation the perforated bottom G of the hopper A rests upon the knives C, sliding freely thereon in the frame B, moved by the pitman E, crank F, and pulley H. The perforations in the plate G are made conical, so that the oats, when cleaned and hulled, will drop endwise through them, as shown at *a*, Fig. 1, and be arrested by the bars D until cut off by the knives C. From the shape and arrangement of the knives and bars, as shown in cross-section in Fig. 1, it is apparent that until cut off the grain cannot pass below the bars. The bars D may be placed in a frame independent of the knives, and capable of being raised or lowered so as to regulate the size of the particles of meal at will. The knives and hopper may, one or both, have a motion to accomplish the shearing of the grain, and this motion may be reciprocal, regulated by guides, or rotary, like millstones.

I claim as my invention—

1. The bars D, applied in relation to the plate G and knives C, substantially as and for the purpose hereinbefore set forth.

2. The combination of the bars D with the knives C and plate G, substantially as and for the purpose hereinbefore set forth.

WILLIAM HESTON.

Witnesses:
JOHN H. CAMPBELL,
C. P. HUMPHREY.